United States Patent Office 3,429,780
Patented Feb. 25, 1969

3,429,780
FERMENTATION PROCESS FOR THE PRODUCTION OF TETRACYCLINE
Karel Culik, Josef Palkoska, Miloslav Vondracek, and Jan Skoda, Prague, and Milos Herold, deceased, late of Prague, by Josefa Heroldova, sole heir, Prague, Czechoslovakia, assignors to Spofa Sdruzeni Pro Zdrovotnickou Vyrobu, Prague, Czechoslovakia
No Drawing. Filed Sept. 16, 1965, Ser. No. 487,931
Claims priority, application Czechoslovakia, Sept. 19, 1964, 5,228/64
U.S. Cl. 195—80                            10 Claims
Int. Cl. C12d 9/18

This invention relates to a process of producing tetracycline by cultivation of microorganisms that are suited to produce both tetracycline and chlorotetracycline. More specifically, the invention relates to a method as indicated wherein chlorination inhibitors are employed.

Microorganisms of the genus Streptomyces which under certain cultivation conditions produce chlorotetracycline are able to produce tetracycline under different conditions. Since no chlorotetracycline can be formed unless chloride ions are present, the tetracycline production can be increased and the chlorotetracycline production limited by either decreasing the concentration of chloride ions or by eliminating them altogether from the cultivation medium (U.S. Patent 2,734,018).

The problem has also been approached by adding competitive chlorination inhibitors such as inorganic bromine or fluorine salts which likewise result in an increased proportion of tetracycline (Patent 2,739,924). Some of the chlorination inhibitors added to the cultivation medium are chemically well defined compounds containing as a rule nitrogen and sulfur in their molecules while others are naturally occurring substances.

The difficulty encountered with the chlorine inhibitors is that many of them exhibit toxicity for the producing strain of the microorganism. This is particularly the case when they are added in larger proportions or at least large enough to be effective to the desired degree.

It is therefore an object of the present invention to provide for an improved method of producing tetracycline by cultivation of microorganisms which may also produce chlorotetracycline.

A more specific object is to inhibit in an effective manner the production of chlorotetracycline in these processes without affecting the overall yield because of toxicity to the producing strain of microorganisms. To put it differently, the object of the invention is to provide chlorination inhibitors for processes of the type as indicated which combine a strong antimetabolic activity with only moderate toxicity for the producing strain of the microorganism.

A still further object is to provide inhibitors for the chlorination in these processes which are effective even with strong concentrations of chloride ions irrespective whether the ions are encountered in the formative media or are present in the natural raw materials employed in preparing the medium such as cornsteep or soy bean oil or whether there are chloride furnishing substances specifically added to the medium.

These and other objects of the invention will be apparent from the following discussion and the following examples.

It has been found that highly efficient chlorine inhibitors are compounds of the general formula

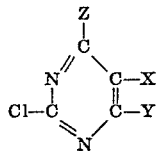

wherein Z is hydrogen, OH or Cl, X is halogen and preferably is chlorine or iodine or is alkyl, aryl, hydrogen, $NH_2$ or $NO_2$ and wherein Y is hydrogen, chlorine, $NH_2$ or COOH. X and Y in this formula may also be members of a second 5- or 6-membered aromatic or heterocyclic ring.

Specifically preferred inhibitors are the 2,4-dichloro pyrimidine derivatives and among these the preferred compounds are the following: 5-iodo-2,4-dichloro pyrimidine, 5-methyl-2,4,6-trichlor pyrimidine, 5-methyl-2,4-dichloro pyrimidine, 2,4-dichloro pyrimidine itself and 2,6-dichloropurine derivatives.

All of these compounds exhibit a marked antimetabolic effect and inhibit chloride ion utilization and therefore inhibit the chlorine incorporation into the molecule of the formed tetracycline. They are effective with the chloro tetracycline producing strain Streptomyces sp. BMK. They meet all of the requirements above illustrated. They are highly specific when added to the fermentation media. They suppress the chloro tetracycline formation almost entirely. This effect prevails both in the presence of chloride ions in concentrations normally encountered in fermentation media and introduced with natural raw materials used in the preparation of the media such as cornsteep and soy bean. These inhibitors are in addition effective even where additional chlorides are added to the media.

The inhibitors may be used either singly or several of the inhibitors may be added to the media in which the fermentation proceeds.

A fermentation medium containing 5% sucrose, 4% soy bean meal, 0.63% calcium carbonate, 0.63% ammonium sulfate, 0.25% molasses, 0.30% cornsteep liquor (solids), 0.2% soy bean oil, 0.0000054% benzyl thiocyanate, was inoculated with 5% of a 24-hour old culture of the strain Streptomyces sp. BMK. grown on a medium of the same composition. Submerged cultivation was performed in 1-liter fermentors under aeration and agitation at 30° C. for a period of 84–92 hours. In addition to assaying overall tetracycline activity, the TC:CTC ratio was ascertained by chromatography at the end of each run. The antimetabolites were added to sterilized fermentation media in sterile aqueous suspensions containing 4 mcg./ ml. of medium. The total volume of the medium was about 500 to 600 ml.

As additional control, runs were carried out with each inhibitor in which 0.4% NaCl was added in each run to the medium. The results are summarized in the following Table:

TABLE

| Example | Inhibitor | Percent of NaCl in medium | Overall yield of antibiotic activity in in g/ml. | Percent of TC |
|---|---|---|---|---|
| 1 | 5-iodo-2,4-dichloro-pyrimidine. | ----- | 3,910 | 95 |
|   |   | 0.4 | 3,820 | 85 |
| 2 | 5-methyl-2,4,6-trichloro-pyrimidine. | ----- | 3,760 | 95 |
|   |   | 0.4 | 3,660 | 80 |
| 3 | 5-methyl-2,4-dichloro-pyrimidine. | ----- | 3,690 | 95 |
|   |   | 0.4 | 3,780 | 80 |
| 4 | 2,4-dichloro-pyrimidine. | ----- | 3,810 | 95 |
|   |   | 0.4 | 3,910 | 80 |
| 5 | 2,6-dichloro-7-methyl-purine. | ----- | 3,640 | 80 |
|   |   | 0.4 | 3,520 | 75 |
| 6 | 2,4-dichloro-pyrimidine (2 mcg./ml.). | ----- | 3,820 | 95 |
| 7 | 5-methyl-2,4,6-trichloropyrimidine (2 mcg./ml.). | 0.4 | 3,760 | 85 |
|   | Control without inhibitor. | ----- | 4,100 | 40 |

Without further analysis, the foregoing will so fully reveal the gist of the present invention that others can by applying current knowledge readily adapt it for various applications without omitting features that, from the standpoint of prior art, fairly constitute essential char-

3 acteristics of the generic or specific aspects of this invention and, therefore, such adaptations should and are intended to be comprehended within the meaning and range of equivalence of the following claims.

What is claimed as new ad desired to be secured by Letters Patent is:

1. In a process for the production of tetracycline by submerged fermentation in a liquid medium containing assimilable carbon and nitrogen sources plus inorganic nutrient salts under aerobic conditions microorganisms of the genus Streptomyces capable of producing both chlorotetracycline and tetracycline, followed by isolation of the desired product from the fermented broth, the improvement which comprises adding to the fermentation medium at least one chlorination inhibitor corresponding to the general formula

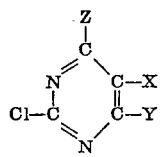

wherein Z is a substance selected from the group consisting of H, OH and Cl, X is a substance selected from the group consisting of halogen, alkyl, aryl, H, $NH_2$ and $NO_2$ and wherein Y is a substance selected from the group consisting of H, Cl, $NH_2$ and COOH, said chlorination inhibitor being present in an amount effective to inhibit chlorination.

2. In a process for the production of tetracycline by submerged fermentation in a liquid medium containing assimilable carbon and nitrogen sources plus inorganic nutrient salts under aerobic conditions microorganisms of the genus Streptomyces capable of producing both chlorotetracycline and tetracycline, followed by isolation of the desired product from the fermented broth, the improvement which comprises adding to the fermentation medium at least one chlorination inhibitor corresponding to the general formula

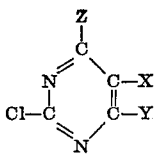

wherein Z is a substance selected from the group consisting of H, OH and Cl, X is a substance selected from the group consisting of bromine, iodine, alkyl, aryl, H, $NH_2$ and $NO_2$ and wherein Y is a substance selected from the group consisting of H, Cl, $NH_2$ and COOH, said chlorination inhibitor being present in an amount effective to inhibit chlorination.

3. In a process for the production of tetracycline by submerged fermentation in a liquid medium containing assimilable carbon and nitrogen sources plus inorganic nutrient salts under aerobic conditions microorganisms of the genus Streptomyces capable of producing both chlorotetracycline and tetracycline, followed by isolation of the desired product from the fermented broth, the improvement which comprises adding to the fermentation medium at least one chlorination inhibitor corresponding to the general formula

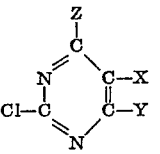

wherein Z is Cl, X is a substance selected from the group consisting of bromine, iodine, alkyl, aryl, H, $NH_2$ and $NO_2$ and wherein Y is a substance selected from the group consisting of H, Cl, $NH_2$ and COOH, said chlorina-

4 tion inhibitor being present in an amount effective to inhibit chlorination.

4. In a process for the production of tetracycline by submerged fermentation in a liquid medium containing assimilable carbon and nitrogen sources plus inorganic nutrient salts under aerobic conditions microorganisms of the genus Streptomyces capable of producing both chlorotetracycline and tetracycline, followed by isolation of the desired product from the fermented broth, the improvement which comprises adding to the fermentation medium at least one chlorination inhibitor corresponding to the general formula

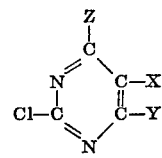

wherein Z is chlorine, X is a substance selected from the group consisting of bromine, iodine, alkyl, aryl, H, $NH_2$ and $NO_2$ and wherein Y is chlorine, said chlorination inhibitor being present in an amount effective to inhibit chlorination.

5. In a process for the production of tetracycline by submerged fermentation in a liquid medium containing assimilable carbon and nitrogen sources plus inorganic nutrient salts under aerobic conditions microorganisms of the genus Streptomyces capable of producing both chlorotetracycline and tetracycline, followed by isolation of the desired product from the fermented broth, the improvement which comprises adding to the fermentation medium at least one chlorination inhibitor corresponding to the general formula

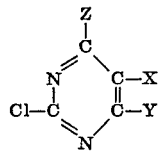

wherein Z is a substance selected from the group consisting of H, OH and Cl, X is a substance selected from the group consisting of halogen, alkyl, aryl, H, $NH_2$ and $NO_2$ and wherein Y is a substance selected from the group consisting of H, Cl, $NH_2$ and COOH, the said chlorination inhibitor being present in the nutrient medium during fermentation at a concentration between 1 and 200 mcg./ml. of the total volume of the medium.

6. In a process for the production of tetracycline by submerged fermentation in a liquid medium containing assimilable carbon and nitrogen sources plus inorganic nutrient salts under aerobic conditions microorganisms of the genus Streptomyces capable of producing both chlorotetracycline and tetracycline, followed by isolation of the desired product from the fermented broth, the improvement which comprises adding to the fermentation medium 2,4-dichloro pyrimidine as chlorination inhibitor, said chlorination inhibitor being present in an amount effective to inhibit chlorination.

7. In a process for the production of tetracycline by submerged fermentation in a liquid medium containing assimilable carbon and nitrogen sources plus inorganic nutrient salts under aerobic conditions microorganisms of the genus Streptomyces capable of producing both chlorotetracycline and tetracycline, followed by isolation of the desired product from the fermented broth, the improvement which comprises adding to the fermentation medium 5-iodo-2,4-dichloro pyrimidine as chlorination inhibitor, said chlorination inhibitor being present in an amount effective to inhibit chlorination.

8. In a process for the production of tetracycline by submerged fermentation in a liquid medium containing assimilable carbon and nitrogen sources plus inorganic nutrient salts under aerobic conditions microorganisms of the genus Streptomyces capable of producing both chlorotetracycline and tetracycline, followed by isolation of the desired product from the fermented broth, the improvement which comprises adding to the fermentation medium 5-metyl-2,4-dichloro pyrimidine as chlorination inhibitor, said chlorination inhibitor being present in an amount effective to inhibit chlorination.

9. In a process for the production of tetracycline by submerged fermentation in a liquid medium containing assimilable carbon and nitrogen sources plus inorganic nutrient salts under aerobic conditions microorganisms of the genus Streptomyces capable of producing both chlorotetracycline and tetracycline, followed by isolation of the desired product from the fermented broth, the improvement which comprises adding to the fermentation medium 5-methyl-2,4,6-trichloro pyrimidine as chlorination inhibitor, said chlorination inhibitor being present in an amount effective to inhibit chlorination.

10. In a process for the production of tetracycline by submerged fermentation in a liquid medium containing assimilable carbon and nitrogen sources plus inorganic nutrient salts under aerobic conditions microorganisms of the genus Streptomyces capable of producing both chlorotetracycline and tetracycline, followed by isolation of the desired product from the fermented broth, the improvement which comprises adding to the fermentation medium 2,6-dichloro-7-methylpurine as chlorination inhibitor, said chlorination inhibitor being present in an amount effective to inhibit chlorination.

References Cited

UNITED STATES PATENTS 3,019,173  1/1962  Arishima et al. _____ 195—80

FOREIGN PATENTS 1,074,826  2/1960  Germany.

MAURICE W. GREENSTEIN, *Primary Examiner.*

U.S. Cl. X.R.

195—114